3,179,496
METHOD OF PREPARING A STABLE AMMONIUM PHOSPHATE COMPOSITION
Davis A. Skinner, Fullerton, and John D. Wordie, Long Beach, Calif., assignors to Union Oil Company of California, Los Angeles, Calif., a corporation of California
No Drawing. Filed Oct. 23, 1961, Ser. No. 147,096
The portion of the term of the patent subsequent to May 14, 1974, has been disclaimed
5 Claims. (Cl. 23—107)

This application is a continuation-in-part of our copending application, Serial No. 492,804, filed March 7, 1955, and now abandoned.

This invention relates to new fertilizer compositions and to a method for preparing the same, and in particular concerns aqueous compositions essentially comprising ammonium phosphate obtained from crude wet-process phosphoric acid.

The manufacture of ammonium phosphate fertilizers by reaction between ammonia and crude wet-process phosphoric acid involves serious technical difficulties attributable to the presence of impurities in the crude acid. The latter (sometimes referred to as "green acid" because of its color) is obtained by treating phosphate rock, which essentially comprises calcium phosphate, with sulfuric acid and filtering off the insoluble calcium sulfate which is formed as a by-product. The crude "green" acid product is highly impure and contains relatively large amounts of dissolved calcium sulfates, fluorides, and fluosilicates, aluminum, magnesium, iron and other metals, as well as suspended organic matter and carbon. In commercial 52 percent $P_2O_5$ acid, these impurities comprise between about 1 and 10 weight percent, the most common content of impurities being between about 3 and 7 weight percent. When such crude acid is treated with ammonia to form either mono- or di-ammonium phosphate, or a mixture of both, the metallic impurities are precipitated. The iron and aluminum impurities are particularly troublesome as they are thrown out of solution as gelatinous precipitates which are substantially impossible to separate from the aqueous phase by ordinary methods. When iron and aluminum are present in amounts greater than about 3 percent, the entire aqueous phase often gels into a solid mass.

While the precipitates in no way interfere with the plant nutrient value of the ammonium phosphate (in fact they are considered to have fertilizing value of their own) they settle in the bottom of storage vessels and clog the pipelines and other equipment used for applying the product to the soil. It is for this reason that substantially all of the ammonium phosphate made from crude "wet-process" phosphoric acid for fertilizer purposes is manufactured, marketed and applied to the soil in solid form. However, the expense inherent in evaporating the aqueous material to produce a dry product, together with the cost of packaging and otherwise handling such a product, have seriously limited the use of ammonium phosphate manufactured from crude "wet-process" acid as a fertilizer.

It is accordingly an object of the present invention to provide improved liquid fertilizer compositions which comprise ammonium phosphate obtained from crude "wet-process" phosphoric acid and the metallic and carbonaceous impurities normally incident thereto.

Another object is to provide a means for stably dispersing the solids which ordinarily settle out of aqueous ammonium phosphate solutions prepared by reacting crude wet-process phosphoric acid with ammonia.

Other objects will be apparent from the following detailed description of the invention, and various advantages not specifically referred to herein will occur to those skilled in the art upon employment of the invention in practice.

We have now found that the above objects and attendant advantages may be attained by incorporating into the crude ammonium phosphate product certain agents which serve to maintain the solid components of such product stably dispersed and suspended in the liquid phase thereof. More particularly, we have found that colloidal clays, preferably attapulgite, colloidal silicon and colloidal alumina are capable of promoting the stable dispersion and suspension of the normally incident solid or gelatinous mineral and carbonaceous impurities in ammonium phosphate solutions obtained by reacting crude wet-process phosphoric acid with ammonia. Such agents do not in any way interfere with the plant nutrient properties of the aqueous ammonium phosphate, and are effective in relatively small amounts. They may be incorporated into the ammonium phosphate product either during or after its preparation, or may be incorporated into the wet-process phosphoric acid or aqua ammonia reactant stream prior to neutralization.

As stated, the dispersing agents which are employed in accordance with the invention are selected from the class consisting of montmorillonite, attapulgite, silica and alumina, preferably in colloidal form. The uniqueness of montmorillonites and attapulgite among all the various absorptive clays for dispersing the precipitates in the ammonium phosphate solutions was quite surprising, adsorptive clays such as fuller's earth and kaolins being ineffective for applicants' purpose. In particular, it was very surprising to discover the superiority of attapulgite for this use, since attapulgite is not commonly considered to have an appreciable effect in surface chemistry.

The attapulgite clays are recognized to be a distinct form of clay, having a crystal characteristic of a chain structure. This chain comprises silica tetrahydrins linked together by octahedral groups of oxygens and hydroxyls containing aluminum and magnesium atoms. Members of this group comprise attapulgite, sepiolite, and palygorskite. A description of the structure of attapulgite according to Bradley, W. F., The Structural Scheme of Attapulgite, can be found in American Mineral, vol. 25, page 405–410 (1940). It is therein stated that attapulgite comprises double silica chains parallel to the c-axis linked together with oxygen atoms at their longitudinal edges. The apexes of the tetrahedron in successive chains point in opposite directions, forming a kind of double ribbed sheet. The ribbed sheets are held together by aluminum and/or magnesium in octahedral coordination between the apex oxygens of successive sheets. The group of clays, sepiolite, attapulgite, palygorskite, are characterized by low to moderate cationic exchange capacity having between about 20 and 30 milliequivalents per 100 grams. These materials are characterized by a high silica content, generally between about 46 to about 56 percent, relatively low aluminum oxide content less than about 15 weight percent, magnesium oxide content between about 5 and 21 weight percent, and about 8 to about 11 weight percent adsorbed and chemically bonded water. Minor amounts, less than about 3 percent of iron, calcium, potassium, and sodium as the oxides are also present.

A second group of clays which can be used with some success are the montmorillonites. The montmorillonites are not the equivalent of attapulgites in this respect and are more sensitive to the nature of the precipitate formed in the ammonium phosphate. Montmorillonites can be used, however, by exercising proper control over the neutralization of the wet-process acid in a manner hereinafter described.

The montmorillonites comprise a class of expanding lattice clays having sheet configurations composed of two layers of silica tetrahedrons and one central dioctahedral or trioctahedral layer. These clays have chemical analysis of: silica between about 49 and 55 weight percent, alumina between about 15 and 20 weight percent, iron oxides from trace to about 3 weight percent, magnesia between about 3 and 6 weight percent, calcium oxide between about 0.5 and 3 weight percent, traces of potassium and sodium and between about 10 and 25 weight percent adsorbed and combined water. Typical members of the montmorillonites are: montmorillonite, sauconite, nontronite, saponite, hectorite, etc.

The colloidal silicas useful as suspending agents are represented by such materials as diatomaceous earth and the artificially prepared silica aerogels. Examples of such materials are Cellite, a diatomaceous silica manufactured by the Johns Mansville Company; Santocels, a silica aerogel manufactured by the Monsanto Chemical Company; etc.

Colloidal alumina and bauxite can also be employed as the suspending agent. A typical product commercially available is Alon-C marketed by the Godfrey L. Abbott Company and is an aqueous dispersion grade of alumina.

The quantity of the aforementioned dispersing agents required to maintain the impurities stably suspended in the aqueous ammonium phosphate depends primarily upon the source of the crude phosphoric acid employed in manufacturing the ammonium phosphate, i.e., upon the nature and quantity of such impurities in the crude acid, and upon the identity of the dispersing agent itself. It also depends upon thoroughness with which the agent is dispersed in the ammonium phosphate solution. In general, however, satisfactory results are obtained by incorporating the dispersing agent in the aqueous ammonium phosphate in an amount representing generally between about 0.1 and about 5 percent by weight, preferably between about 0.1 and about 2 percent by weight, of the entire composition.

We have found that in order to obtain a stably dispersible suspension with montmorillonites, silica and alumina the ammonium phosphate must be neutralized under conditions in which the pH does not fall below about 6. Neutralization of the acid under acid conditions, i.e., pH values below about 6, and/or elevated temperatures or prolonged times under such pH conditions, tends to form a granular precipitate having relatively large particle size. This product is too difficult to suspend with all of the above identified mineral dispersing agents except attapulgite. Although attapulgite is effective in dispersing this precipitate, best results are secured even with this dispersing agent when the acid is neutralized under neutral or alkaline conditions. Accordingly, it is preferred to conduct the neutralization of the acid under neutral or alkaline conditions. Neutralization at about neutral pH values, i.e., about 6 to about 8, tends to form gelatinous type precipitates which be readily dispersed with the above identified agents. More alkaline conditions can be employed if desired so as to reduce the gelatinous properties of the precipitate and produce a less thixotropic product. In general, neutralization at pH values above about 8.0 provides a less thixotropic product which can be stably dispersed.

The dispersing agent can be incorporated into the ammonium phosphate product by several methods. According to one mode of preparing the compositions of the invention, the montmorillonite, attapulgite, silica or alumina dispersing agent is incorporated into the ammonium phosphate product solution simply by gradual addition accompanied by vigorous agitation. Alternatively, the dispersing agent may be added during the course of preparation of the aqueous product. In this embodiment, the mineral dispersing agent can be added directly to the neutralization zone as a solid material or in the form of an aqueous dispersion. The material can be incorporated in the neutralization zone either by direct addition or by addition to the reactant streams, e.g., by addition to the phosphoric acid an ammonia, prior to their introduction to the reaction zone. According to a preferred mode of preparation, crude wet process phosphoric acid, ammonia, water, the dispersing agent and recycle portion of the product are introduced into a reaction zone wherein the mixture is violently agitated at a temperature between about 140° and 190° F. In this operation it is important that due consideration be given the order of mixing of the reactants. To practice the preferred form of the invention and avoid acid pH values, i.e., below 6, during neutralization it is important that the ammonia be not added to a large excess of acid, but rather, the ammonia and acid can be admixed in the stoichiometric quantities to obtain the 8–24–0 type composition. If desired, particularly when operating under alkaline conditions, the ammonia can be employed in slight excess, and the acid necessary to obtain the final product is added after completion of the ammonia addition. Preferably, so as to provide a buffer condition and permit some tolerance in the admixing of the reactants, a "heel" or reserve of product is maintained in the reaction zone. In a continuous process, this reserve can be in the form of a recycle stream which, preferably, has been cooled so as to maintain the desired reaction temperature.

In any event, the ammonia is employed in such amount that upon completion of the reaction the ammonium phosphate product has a pH value between about 6.3 and about 6.7, and sufficient water is employed so that the total $P_2O_5$ concentration in the reaction mixture is between about 20 and about 30 percent by weight. On a weight basis the ammonia is present in about a 1:3 weight ratio to the $P_2O_5$. In a continuous process, the recycle stream can comprise between about 60 and about 90 percent of the product so as to maintain the proper buffered conditions and temperature in the reaction zone. Conveniently, the reaction zone may take the form of a homogenizer or a centrifugal pump, and in such case the dispersing agent may be introduced directly into the intake of the homogenizer or pump or at a point near the discharge end. Other means of incorporating the dispersing agent into the aqueous ammonium phosphate product may of course be employed, and the invention is not limited to any particular mode of operation in this respect. It is necessary, however, that the dispersing agent be very intimately combined with the aqueous ammonium phosphate, and it is preferred to secure such intimate association by means of high speed stirring devices, homogenizers, centrifugal pumps or other equipment which subjects the mixture to strong shearing forces.

It is likewise possible to secure a satisfactorily dispersed product by subjecting the aqueous suspension of the mineral dispersing agent to similar strong shearing forces, for example, by passing the aqueous slip through a homogenizer or colloid mill in the manner well known in the art. The resultant aqueous clay slip can thereafter be thoroughly admixed with the ammonium phosphate product by adding the slip to the reaction zone while stirring or by stirring into the aqueous ammonium phosphate product of the reaction zone.

EXAMPLE 1

The following example presents data illustrating the extent to which the present class of dispersing agents maintain solid impurities dispersed in ammonium phosphate solutions prepared from crude wet process phosphoric acid. Comparative data on a number of other well-known dispersants, including relatively ineffective kaolinites and fuller's earth are also included. In this experiment, the ammonium phosphate was prepared in a continuous reactor wherein a product recycle stream was passed through a product cooler and recycled to a reactor. At the inlet to the reactor the phosphoric acid was admixed with the recycle stream and ammonia was passed into the reaction zone at a rate to neutralize the acid supplied with the recycle stream. The acid feed rate was 23.4 ml. per minute of 26.6 weight percent $P_2O_5$ acid and 3.23 grams per minute of anhydrous ammonia was bubbled into the reactor. The recycle rate was maintained at 147 ml. per minute sufficient to buffer the pH of the acid stream entering the reactor and to maintain the reactor temperature at 165° F. The product had a pH of 6.5 and a nitrogen phosphorus content corresponding to an 8–24–0 composition. The product from the reactor passed into a sump which fed the recycle pump. Product was withdrawn through an overflow in this sump. The product withdrawn was collected and blended with various dispersing agents in a Waring Blendor for 15 minutes. Samples of the dispersed 8–24–0 products were then placed in 8 oz. sample bottles for storage stability tests at 70° F. for a given period of time, after which they were examined for phase separation. In most cases, two phases formed: an upper clear phase and a lower opaque phase. The volume percents of these phases are indicated in Table 1. An inspection of Table 1 shows that only the attapulgites, silica and alumina were effective in preventing the formation of less than 10 percent of a clarified aqueous phase. The bentonite, in permitting the formation of a clarified phase comprising 11 volume percent, would be acceptable but not as desirable and satisfactory as the other dispersing agents. The remainder of the dispersing agents were not satisfactory.

*Table 1*

| Expt. No. | Dispersing Agent | | Days Stored | Phase Separation, Vol. Percent | |
|---|---|---|---|---|---|
| | Name | Wt. Percent of Product | | Upper Clear | Lower Opaque |
| 1 | None | | 7 | 15 | 85 |
| 2 | do | | 28 | 27 | 73 |
| 3 | Alon-C a | 1.0 | 28 | 5 | 95 |
| 4 | Attasorb b | 1.0 | 28 | 5 | 95 |
| 5 | Attasorb | 0.5 | 28 | 8 | 92 |
| 6 | Bentonite (325 Mesh) | 1.0 | 28 | 11 | 89 |
| 7 | Permagel c | 0.5 | 28 | 8 | 92 |
| 8 | Silica Aerogel | 1.0 | 28 | 7 | 93 |
| 9 | Dispersant NI-W d | 0.5 | 28 | 16 | 84 |
| 10 | Igepol CD-88D e | 0.5 | 28 | 18 | 82 |
| 11 | Orzan AH-O f | 1.0 | 7 | 18 | 82 |
| 12 | Polyfon H g | 1.0 | 7 | 18 | 82 |
| 13 | Calaf clay h | 1.0 | 28 | 13 | 87 |
| 14 | Mono-90 clay i | 1.0 | 28 | 26 | 74 |
| 15 | Utah clay j | 1.0 | 28 | 18 | 82 | a Colloidal alumina.
b Purified attapulgite.
c Purified attapulgite.
d Polyoxyethylated alkylphenol.
e Polyoxyethylated alkylphenol.
f Lignin sulfonate.
g Sodium lignin sulfonate.
h Kaolinite fireclay.
i Kaolinite fireclay.
j Utah fuller's earth.

EXAMPLE 2

The aforedescribed continuous reactor was employed in the preparation of a dispersed ammonium phosphate product in which an aqueous slip of the dispersing agent, colloidal attapulgite, was subjected to high shear forces (comparable to those in a colloid mill) and thereafter introduced into the reactor.

In the first technique, an aqueous slip of colloidal attapulgite was prepared by admixing 130 ml. of water with 14.2 grams of colloidal attapulgite and subjecting the admixture to high shear conditions for one minute in a Waring Blendor. The resultant clay suspension was blended with the phosphoric acid stream to the reactor. To initiate a reaction, a "heel" of recycle was prepared by admixing 2.7 grams of colloidal attapulgite with 200 ml. of previously prepared 8–24–0 and blending the mixture for one minute in a Waring Blendor. The recycle stream was circulated through the reactor and thereafter phosphoric acid of 26.6 percent $P_2O_5$ content was added thereto at the rate of 24.4 ml. per minute. Anhydrous ammonia was introduced into the reactor at the rate of 3.36 grams per minute and the product was recycled at the rate of 153 ml. per minute. The reaction zone was stirred at 600 r.p.m. and maintained at a temperature of 165° F. The product pH was 6.45. The product was withdrawn as an overflow from the product sump and inspected for phase separation. No phase separation was immediately observable, and after storage for 24 hours, the upper clear liquid phase constituted only 4 percent of the total liquid volume, the remainder being a cloudy homogeneous liquid.

The reaction was repeated, however in this instance, the colloidal attapulgite was triturated into the phosphoric acid feed. The product was a homogeneous liquid having all the impurities present in a dispersed form and a pH of 6.4. Upon storage for 24 hours, no separation of phases was visible and after 21 days, it was observed that a clear aqueous upper phase had formed which constituted only about 4 volume percent of the liquid. No sedimentation was observed.

When the preceding experiment was repeated without the addition of a dispersing agent, it was observed that the liquid product rapidly separated, after 1 day of storage the clear phase comprising between about 27 and 36 percent of the product volume, the remainder being the settled impurities. After 11 days, the samples were inspected and found to comprise between about 35 and 40 volume percent of a clarified liquid, the remainder being a settled gel-like solid material.

EXAMPLE 3

In a batch process, a 3-necked flask was equipped with a stirring paddle, a thermometer and reflux condenser. A phosphoric acid feed line was positioned to admit wet process phosphoric acid into the flask beneath the liquid level therein and an entrance beneath the liquid level for aqua ammonia was also furnished. An electrical heater was supplied to maintain the desired temperature in the reactor. The reaction was commenced by slowly admitting aqua ammonia and phosphoric acid to the reaction flask at controlled rates so as to obtain a pH in the flask above about 6.0. Phosphoric acid having a concentration of about 52 weight percent $P_2O_5$ was admitted to the reactor at a rate of 11 ml. per minute and therein admixed with aqua ammonia and reaction product. The aqua ammonia had a concentration of about 26 weight percent ammonia and was admitted at a rate of 16 ml. per minute. The reaction temperature was maintained at about 215° F. The product having a pH of 6.37 was withdrawn and admixed with colloidal attapulgite to obtain a concentration of 1 weight percent of the latter in the ammonium phosphate. The admixture was subjected to high shear force in a Waring Blendor for 15 minutes. After 24 hours storage, the product showed no phase separation but was a completely homogeneous liquid suspension. After 20 days of storage the product still showed no phase separation, maintaining its homogeneous nature.

EXAMPLE 4

Phosphoric acid having a $P_2O_5$ content of about 52 weight percent was admixed with 1005 grams of water and the admixture introduced into a 3-liter flask and heated therein to 200° F. Anhydrous ammonia was thereafter slowly added while maintaining the temperature at about 200° F. until the product pH of 6.44 was reached. The ammoniation period was about 100 minutes. The product was thereafter cooled to 75° F. and to samples thereof were added the various dispersing agents set forth in Table 2. The admixtures of ammonium phosphate products and agents were subjected to high shear forces on a Waring Blendor for 15 minutes and then placed into sample bottles for observation and storage. After the indicated storage period, the samples showed extensive phase separation having the following volume percent distributions between the upper and lower stratified layers.

Table 2

| Expt. No. | Dispersing Agent | | Days Stored | Phase Separation, Vol. Percent | |
|---|---|---|---|---|---|
| | Name | Wt. Percent of Product | | Upper Clear | Lower Opaque |
| 16 | None | | 1 | 34 | 66 |
| 17 | do | | 47 | 48 | 52 |
| 18 | Perlite a | 1 | 1 | 39 | 61 |
| 19 | Filtrol b | 1 | 1 | 29 | 71 |
| 20 | Adsorbol c | 1 | 1 | 37 | 63 |
| 21 | Attapulgite | 1 | 1 | 4 | 96 |
| 22 | do | 1 | 49 | 40 | 60 |
| 23 | do | 1.5 | 1 | 4 | 96 |
| 24 | do | 1.5 | 49 | 16 | 84 |
| 25 | Permagel | 0.5 | 1 | 2 | 98 |
| 26 | do | 0.5 | 47 | 27 | 73 |
| 27 | X-417 d | 1 | 1 | 33 | 67 | a An expanded volcanic rock.
b A hydrogen bentonite manufactured by The Filtrol Corp.
c Talc, magnesium silicate.
d An acid washed bentonite manufactured by The Filtrol Corp.

The preceding data clearly shows that of the clay dispersing agents, only the attapulgites are effective to disperse precipitates formed upon neutralization of wet process phosphoric acid under acid conditions, i.e., pH values below 6.0. Even with attapulgite, prolonged storage is not recommended because of the settling tendency of the precipitates. For this reason, neutral or alkaline (pH values above 6.0) are preferred for the acid neutralization.

The preceding examples are intended solely to illustrate the operation of my invention and are not to be construed as unduly limiting thereof. The examples have demonstrated the uniqueness of the dispersing agents of our invention for the dispersion of precipitated impurities in an ammonium phosphate solution. The examples also demonstrate the preference for neutralization of the ammonium phosphate under non-acid conditions, i.e., pH values above about 6, and illustrate embodiments in which the clay is added to the reaction zone and therein maintained under high shear conditions or in which the clay is subjected to high shear conditions in an aqueous suspension and then added to the reaction zone, or, finally, the clay is admixed with the ammonium phosphate product and thereafter subjected to high shear conditions to obtain the necessary dispersion of clay and precipitates throughout the liquid product.

As will be apparent to those skilled in the art, the invention is capable of many modifications, particularly with respect to the manner in which the crude ammonium phosphate product is obtained and in the manner in which the dispersing agents of the present class are incorporated into such product. In its broadest aspects, the invention relates to aqueous ammonium phosphate compositions prepared by reaction between crude wet process phosphoric acid and containing the impurities normally incident thereto and an amount of montmorillonite, attapulgite, colloidal silica or colloidal alumina sufficient to maintain such impurities stably suspended.

Other modes of applying the principle of our invention may be employed instead of those explained, change being made as regards methods or materials employed, provided the composition stated by any of the following claims, or the equivalent of such stated composition, be obtained or the step or steps stated by any of such claims be employed.

We claim:
1. The method of preparing a stable ammonium phosphate composition which comprises: (1) introducing into a reaction zone; (a) a recycled portion of said ammonium phosphate composition, (b) crude wet-process phosphoric acid containing normally incident impurities which precipitate as solids upon neutralization, (c) ammonia, (d) water and (e) suspending agent selected from the class consisting of colloidal silica and colloidal alumina, the amount of ammonia being such that said ammonium phosphate which is subsequently withdrawn from the reaction zone has a pH value between about 6.3 and about 6.7, the amount of water being such that the total $P_2O_4$ concentration within the reaction zone is between about 20 and about 30 percent by weight; (2) controlling introduction of said ammonia into said reaction zone to maintain the pH of the reaction zone at all times during said preparation above about 6.0 so as to form said precipitates in gelatinous form, the amount of suspending agent being sufficient to maintain said solids stably suspended in said ammonium phosphate; (3) maintaining a temperature between about 140° F. and about 170° F. within the reaction zone; (4) violently agitating the reaction mixture to subject said mixture to strong shearing forces within the reaction zone; (5) upon completion of the reaction and attainment of said pH value withdrawing said ammonium phosphate from the reaction zone; and (6) returning between about 60 and about 90 percent of said ammonium phosphate to the reaction zone as said recycled portion of ammonium phosphate composition.

2. The method of preparing a stable ammonium phosphate composition which comprises (1) introducing into a reaction zone; (a) a recycled portion of said ammonium phosphate composition, (b) crude wet process phosphoric acid containing normally incident impurities which precipitate as solids upon neutralization, (c) ammonia, (d) water and (e) suspending agent selected from the class consisting of montmorillonite and attapulgite clays, and the amount of ammonia being such that said ammonium phosphate which is subsequently withdrawn from the reaction zone has a pH value between about 6.3 and about 6.7, the amount of water being such that the total $P_2O_5$ concentration within the reaction zone is between about 20 and about 30 percent by weight; (2) controlling the introduction of said ammonium into said reaction zone to maintain the pH of the reaction zone at all times during said preparation above about 6.0 so as to form said precipitates in gelatinous form, the amount of suspending agent being sufficient to maintain said solids stably suspended in said ammonium phosphate; (3) maintaining a temperature between about 140° F. and about 170° F. within the reaction zone; (4) violently agitating the reaction mixture to subject said mixture to strong shearing forces within the reaction zone; (5) upon completion of the reaction and attainment of said pH value withdrawing said ammonium phosphate from the reaction zone; and (6) returning between about 60 and about 90 percent of said ammonium phosphate to the reaction zone as said recycled portion of ammonium phosphate composition.

3. The method of claim 2 in which said suspending agent is added to said reaction zone as an aqueous suspension, said suspension being subjected to violent agitation prior to its addition to said reaction zone.

4. The method of claim 2 in which said suspending agent is colloidal attapulgite.

5. The method of preparing an ammonium phosphate from wet process phosphoric acid and containing incident impurities stably dispersed in said ammonium phosphate which comprises: (1) subjecting an aqueous suspension of a dispersing agent selected from the group consisting of: montmorillonite, attapulgite, colloidal silica and colloidal alumina, to severe agitation; (2) introducing ammonia to a neutralization zone; (3) adding water to said neutralization zone; and (4) adding thereto said wet process phosphoric acid and said aqueous suspension of dispersing agent; the rate of addition of said ammonia and wet process phosphoric acid being controlled so as to maintain the pH of said neutralization zone at all times above about 6.0 to form gelatinous precipitates from said impurities, the amount of said wet process phosphoric acid and water so added being such that the $P_2O_5$ concentration within the reaction zone is between about 20 and about 30 percent by weight and the amount of ammonia so added being sufficient to provide a product having a pH between about 6.3 and about 6.7.

References Cited by the Examiner

UNITED STATES PATENTS

| | | | |
|---|---|---|---|
| 2,523,204 | 9/50 | Feustal et al. | 252—351 |
| 2,594,257 | 4/52 | Durgin | 252—140 |
| 2,594,258 | 4/52 | Durgin | 252—140 |
| 2,683,658 | 7/54 | Saunders et al. | 71—1 |
| 2,799,569 | 11/54 | Wordie et al. | 71—42 |
| 2,784,110 | 3/57 | Tatlock | 117—54 |
| 2,792,286 | 5/57 | Wordie et al. | 71—41 |

OTHER REFERENCES

McCarter et al. "Thermal Activation of Attapulgus Clay" Industrial and Engineering Chemistry, volume 42, No. 3, pages 529–533.

MAURICE A. BRINDISI, *Primary Examiner.*

GEORGE D. MITCHELL, *Examiner.*